[108.] 2 Shee

MARTIN L. TENDERLING.

Apparatus for Mixing Sugar.

No. 4,536. Reissued Aug. 29, 1

Witnesses.
W. L. Bennem
Louis Seaman

Inventor.
M. L. Tenderling
by his atty
C. S. Kenwick

AM. PHOTO-LITHOGRAPHIC CO. N.Y. (OSBORNE'S PROCESS.)

[108.] 2 Sheets--Sheet 2.

MARTIN L. TENDERLING.

Apparatus for Mixing Sugar.

No. 4,536. Reissued Aug. 29, 1871.

Witnesses.
W. L. Bennem.
Louis Seaman

Inventor.
M. L. Tenderling
by his atty.
E. S. Renwick

AM. PHOTO-LITHOGRAPHIC CO. N.Y. (OSBORNE'S PROCESS.)

UNITED STATES PATENT OFFICE.

MARTIN L. SENDERLING, OF JERSEY CITY, NEW JERSEY.

IMPROVEMENT IN APPARATUS AND PROCESSES FOR MIXING SUGAR.

Specification forming part of Letters Patent No. 60,797, dated January 1, 1867; reissue No. 4,536, dated August 29, 1871.

*To all whom it may concern:*

Be it known that I, MARTIN L. SENDERLING, of Jersey City, in the county of Hudson and State of New Jersey, have invented a certain new and useful Process of Mixing Sugars and Apparatus for carrying on the same, of which the following is a full, clear, and exact description, reference being had to the accompanying drawing forming part of this specification, and in which—

Figure 1:
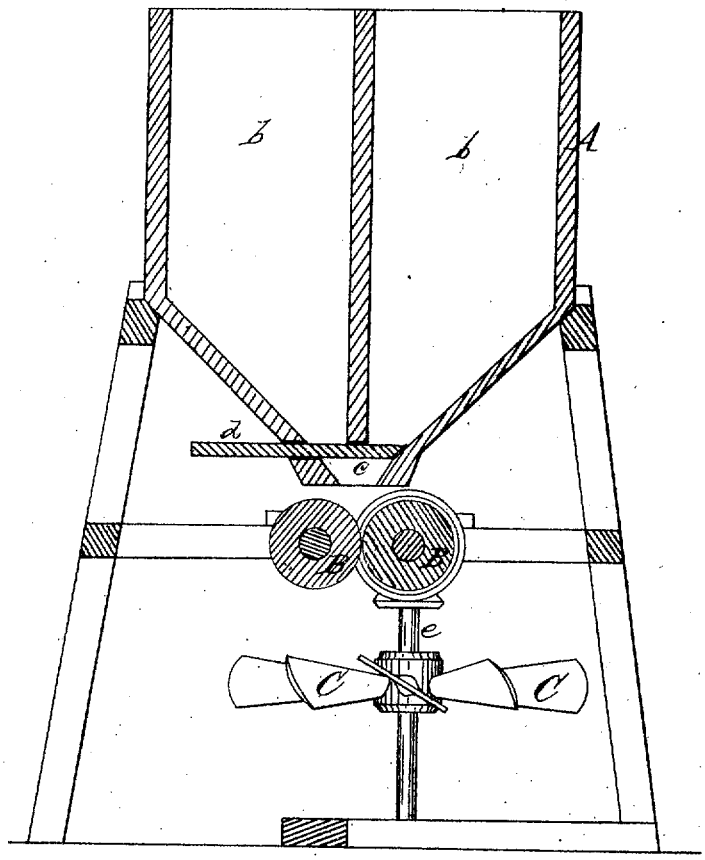
Figure 2:
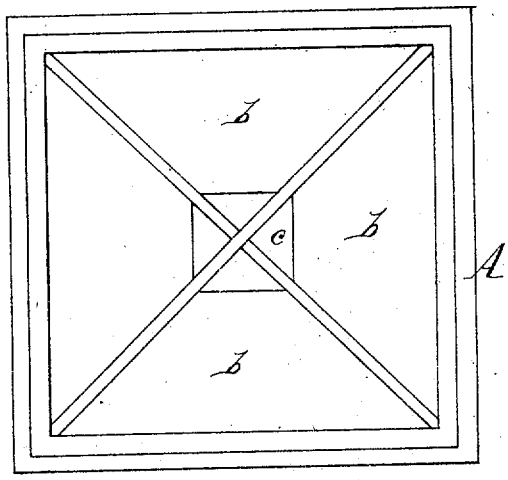
Figure 3:
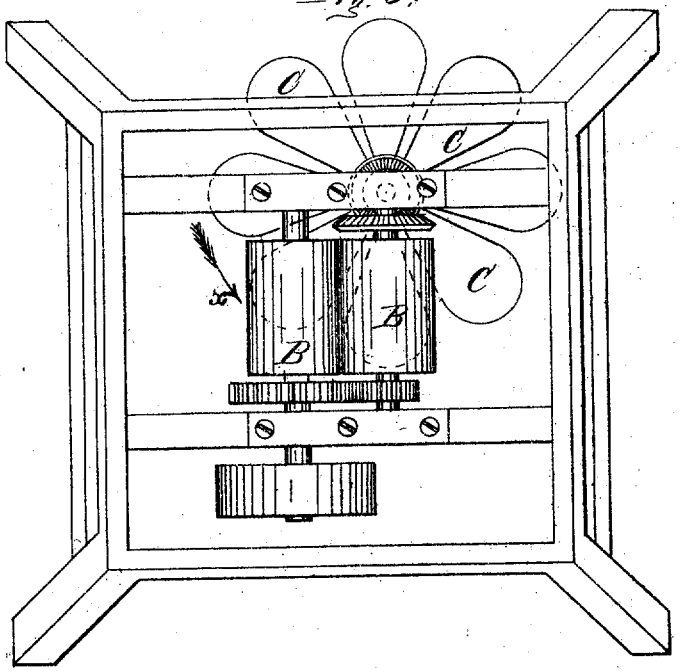

Figure 1 represents a sectional elevation of an apparatus in illustration of my improvement; Fig. 2, a plan of a divided hopper capable of being used in connection with said apparatus; and Fig. 3, a plan of said apparatus with the hopper removed.

Like letters indicate like parts throughout the several figures.

Previous to my invention it was customary to mix sugars of different grades (so as to produce a uniform average grade) by hand labor, the work being effected by scattering the sugars (by means of shovels) in successive layers, which formed a heap that was generally cut down by shovels and rescattered in like manner.

The object of my invention is to enable the mixing to be effected by power; and my invention consists, primarily, of a compound process of producing a uniform grade of sugar from sugars of different grades or qualities, said process consisting of three operations, which are, first, the reduction of the sugars to the granular condition or grains of approximately uniform size; second, the distribution of the grains in thin sheets; and third, the scattering of the grains centrifugally from a common center of motion, so that the various grades are found intimately mixed in the deposit from such distribution and scattering. My invention consists, further, of an apparatus for carrying on the above process, comprising the following mechanisms, viz: The combination of a crushing-mill with a revolving distributer and scatterer; the combination of a crushing-mill, a revolving distributer and scatterer, and a divided hopper, and a revolving distributer and scatterer of peculiar form, arranged to operate in a certain manner, as hereinafter described. The revolving distributer and scatterer, used in combination with the crushing-mill and divided hopper, may be any suitably-constructed wheel, either of a horizontal or vertical character, but I prefer a wheel of horizontal arrangement revolving on a vertical axis situated at one side of the crushing-mill. The crushing-mill used in these combinations may be any crushing-mill capable of crushing the lumps of sugar so as to reduce them to grains; but I prefer to use for the purpose the well-known sugar-crushing mill, composed of two revolving rollers. It is, however, an essential characteristic of the said combinations that the crushing-mill is arranged to operate upon the sugars before they are scattered.

In the accompanying drawing, A represents a hopper, which may be divided into any number of suitable compartments, *b*, for feeding into the apparatus, separately and distinct, sugar of different grades or qualities. The hopper, in this instance, is divided into four compartments, and its orifice *c* is fitted with a slide, *d*, by which it may be closed. Though not absolutely necessary thus to introduce the sugars separate and distinct, as an undivided hopper may be used, and the different grades of sugar be shoveled in or otherwise introduced in successive layers or promiscuously, such a divided hopper, uniting in a common discharge, is preferable, as the relative quantities of the different sugars are more readily determined and controlled, and a more general or equable mixture of them is effected. Beneath the delivery-aperture *c* of the hopper is arranged a sugar-mill, of which B B are the rolls, suitably geared and rotated, and which serve to receive in between them the sugars as they are delivered from the hopper, and to crush all lumps in the different sugars. Thus freed from lumps the granular sugars are then in a condition to be distributed, scattered, and mixed by centrifugal force, which may be developed and applied by any suitably-constructed wheel, either of a horizontal or vertical character. As I prefer a wheel of horizontal arrangement, working on a vertical axis, situated on one side of the mill and rotated by suitable gear, such an arrangement is represented in the drawing. The wheel is made up of vanes C, connected radially with a vertical shaft, *e*, and rotating as indicated by the arrow *x*. These vanes C have their faces set inclining upwardly in a backward direction relatively to the direction of movement, so that the sugars received upon them from the mill are restrained from falling or slipping off, and are acted upon by the wheel, whose vanes, passing rapidly under the falling sugar, present their rapidly-moving surfaces in rapid succession to receive it and thus effect the distribution of the grains in thin sheets upon the said surfaces. The wheel, also, by its rapid revolution, develops and applies centrifugal force to scatter from a common center (which is the center of the wheel) the several grades of sugar received and distributed upon it, so that they deposit in a thoroughly-mixed state upon the floor beneath the apparatus.

What I claim as my invention, and desire to secure by Letters Patent, is—

1. The compound process of mixing sugars so as to produce sugar of a uniform average grade, by first reducing the sugars to be mixed to a granular state; secondly, distributing the grains in thin sheets; and thirdly, scattering them centrifugally from a common center of motion, substantially as before set forth.

2. The combination of a crushing-mill and a rotating scatterer, substantially as before set forth.

3. The combination of a crushing-mill, a rotating scatterer, and a divided hopper, substantially as before set forth.

4. The combination of the inclined vanes of the scattering-wheel with an upright shaft, so arranged that the vanes incline upward and backward relatively to the direction in which the wheel is rotated, substantially as before set forth.

Witness my hand this 31st day of July, A. D. 1871.

MARTIN L. SENDERLING.

Witnesses:
W. L. BENNEM,
THOS. J. TINDALL.